United States Patent
Kubsad et al.

(10) Patent No.: US 12,470,048 B2
(45) Date of Patent: Nov. 11, 2025

(54) CONDUIT FITTING

(71) Applicant: Eaton Intelligent Power Limited, Dublin (IE)

(72) Inventors: Vinaya N. Kubsad, Pune (IN); Jayram Desai, Kolhapur (IN); Gangadhar Mestri, Dharwad (IN); Himanshu Gangadhar Khokle, Nagpur (IN); Joseph V. Lopez, Camillus, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 119 days.

(21) Appl. No.: 18/300,542

(22) Filed: Apr. 14, 2023

(65) Prior Publication Data

US 2023/0344207 A1    Oct. 26, 2023

Related U.S. Application Data

(60) Provisional application No. 63/363,405, filed on Apr. 22, 2022.

(51) Int. Cl.
*H02G 3/06* (2006.01)
*H02G 3/04* (2006.01)

(52) U.S. Cl.
CPC ......... *H02G 3/0616* (2013.01); *H02G 3/0437* (2013.01)

(58) Field of Classification Search
None
See application file for complete search history.

(56) References Cited

U.S. PATENT DOCUMENTS

| | | | |
|---|---|---|---|
| 8,167,338 B2 * | 5/2012 | Davies | H02G 3/0616 285/288.1 |
| 10,962,157 B2 | 3/2021 | Jacobs | |
| 10,969,047 B1 * | 4/2021 | Crompton | F16L 19/086 |
| 2008/0203723 A1 | 8/2008 | Cellemme | |

(Continued)

FOREIGN PATENT DOCUMENTS

| | | | |
|---|---|---|---|
| EP | 1 521 027 B1 | 3/2006 | |
| EP | 3350497 A1 * | 7/2018 | F16L 25/0018 |
| EP | 3 350 497 B1 | 1/2021 | |

OTHER PUBLICATIONS

International Search Report and Written Opinion for PCT/EP2023/025186, Jul. 13, 2023, 10 pages, Rijswijk, The Netherlands.

*Primary Examiner* — Krystal Robinson
(74) *Attorney, Agent, or Firm* — Stinson LLP (57) ABSTRACT

A fitting for an electrical conduit includes a fitting body having first and second open ends, and an interior surface defining a passage adapted to receive a piece of the electrical conduit therein. The fitting body includes a connection section that is configured to receive and connect to the electrical conduit during a connection process. A retainer is in the passage at the connection section of the fitting body. The retainer includes teeth adapted to engage the piece of electrical conduit received in the passage when the electrical conduit is inserted into the connection section during the connection process. A guide is in the passage of the fitting body. The guide is configured to center the piece of electrical conduit in the fitting body before the retainer engages the electrical conduit during the connection process.

20 Claims, 6 Drawing Sheets

(56) References Cited

U.S. PATENT DOCUMENTS

| | | | |
|---|---|---|---|
| 2014/0007407 A1* | 1/2014 | Firestine | H02G 3/06 |
| | | | 285/317 |
| 2020/0248853 A1* | 8/2020 | Kimura | H02G 9/10 |
| 2021/0351576 A1* | 11/2021 | Platt | H02G 3/22 |
| 2022/0316639 A1* | 10/2022 | Kimura | F16L 37/56 |
| 2024/0047903 A1* | 2/2024 | Brouwer | H01R 11/11 |

* cited by examiner

CONDUIT FITTING

CROSS-REFERENCE TO RELATED APPLICATION

This application claims priority to U.S. Provisional Patent Application Ser. No. 63/363,405, filed Apr. 22, 2022, and which is hereby incorporated by reference in its entirety.

FIELD OF THE DISCLOSURE

The present disclosure generally relates to a fitting for an electrical conduit.

BACKGROUND OF THE DISCLOSURE

Electrical conduits are tubes used to protect and route electrical wiring in a building or other structure. Traditional electrical conduit raceway systems are constructed by joining sections of conduit together using couplers, elbows, and conduit fittings. Traditional assembly methods rely on threaded joints to connect the conduits. This method of using threads can be time-consuming and expensive. Fittings for electrical conduits include, but are not limited to: box connecters used to connect conduits to a junction or other electrical box; couplings, used to connect pieces of electrical conduit to one another when installing a run of conduit; and conduit bodies (e.g., Condulets®) used to connect pieces of electrical conduit to one another to provide pulling access in a run of conduit, to allow more bends to be made in a particular section of conduit, to conserve space where a full size bend radius would be impractical or impossible, and/or to split a conduit run into multiple directions.

SUMMARY OF THE DISCLOSURE

In one aspect, a fitting for an electrical conduit generally comprises a fitting body having first and second open ends, and an interior surface defining a passage adapted to receive a piece of the electrical conduit therein. The fitting body includes a connection section that is configured to receive and connect to the electrical conduit during a connection process. A retainer is in the passage at the connection section of the fitting body. The retainer includes teeth adapted to engage the piece of electrical conduit received in the passage when the electrical conduit is inserted into the connection section during the connection process. A guide is in the passage of the fitting body. The guide is configured to center the piece of electrical conduit in the fitting body before the retainer engages the electrical conduit during the connection process.

In another aspect, a fitting for an electrical conduit generally comprises a fitting body having first and second open ends, and an interior surface defining a passage adapted to receive a piece of the electrical conduit therein. The fitting body includes a connection section that is configured to receive and connect to the electrical conduit during a connection process. A retainer is in the passage at the connection section of the fitting body. The retainer includes teeth having sharp edges adapted to cut into the piece of electrical conduit received in the passage when the electrical conduit is inserted into the connection section during the connection process. The teeth resist withdrawal of the electrical conduit immediately upon insertion of the electrical conduit into the passage at the connection section of the fitting body past the retainer.

DETAILED DESCRIPTION OF THE DISCLOSURE

In general, the present disclosure relates to an electrical conduit fitting designed and constructed to be coupled to at least one piece of electrical conduit by at least one of a friction/interference or press connection. The fitting includes at least one of, but not necessarily each of: a conduit retainer for retaining a piece of conduit in the fitting; a guide/alignment structure for axially aligning a piece of conduit in the fitting before being engaged by the conduit retainer; a guide retainer for retaining the guide/alignment structure to the fitting; and a gasket for sealing the connection between the conduit and the fitting. Additional components of the fitting having one or more additional features may also be included without departing from the scope of the disclosure.

Figure 1:
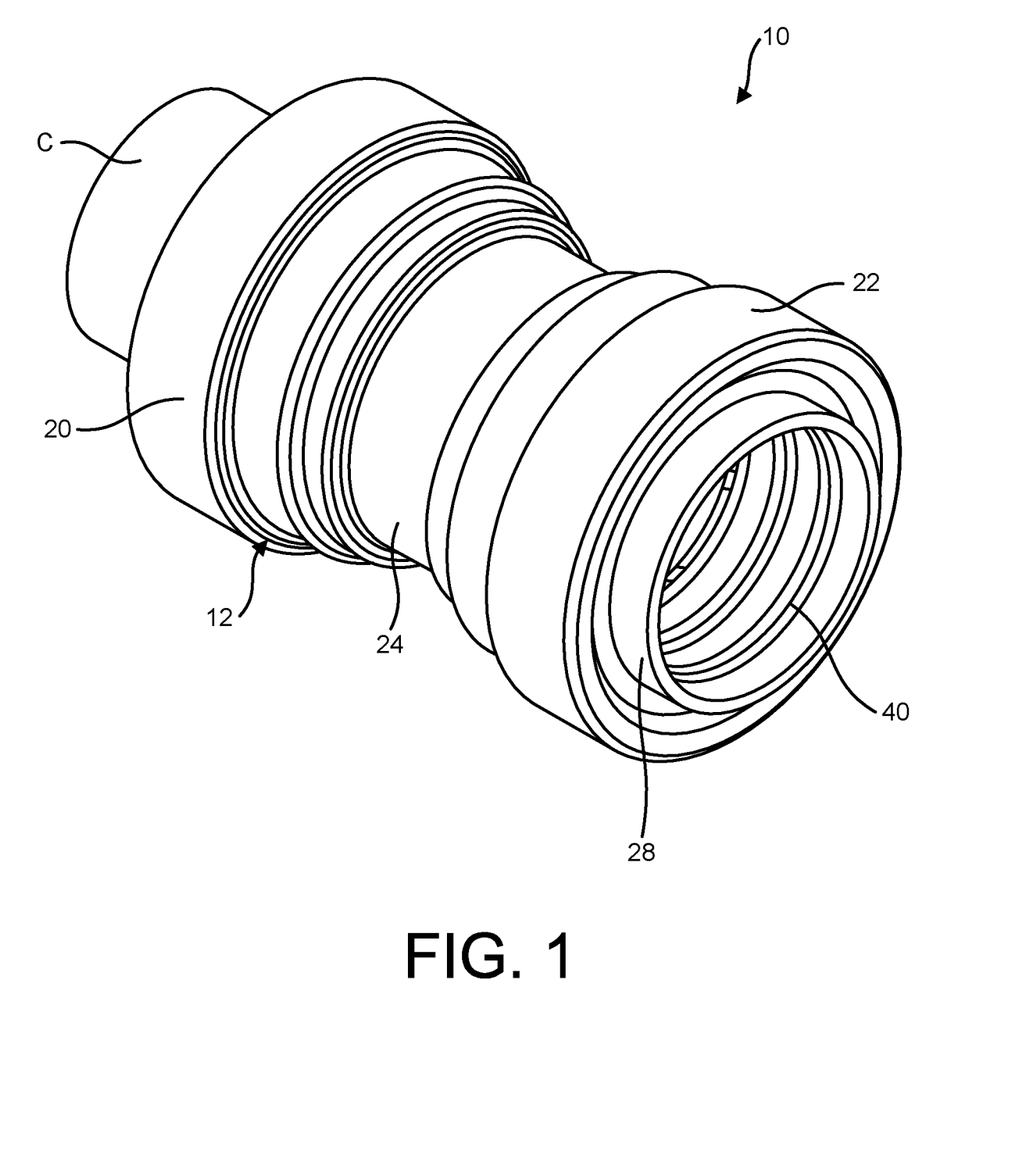
FIG. 1 is a perspective of an electrical conduit fitting showing a conduit received in the fitting.
Figure 2:
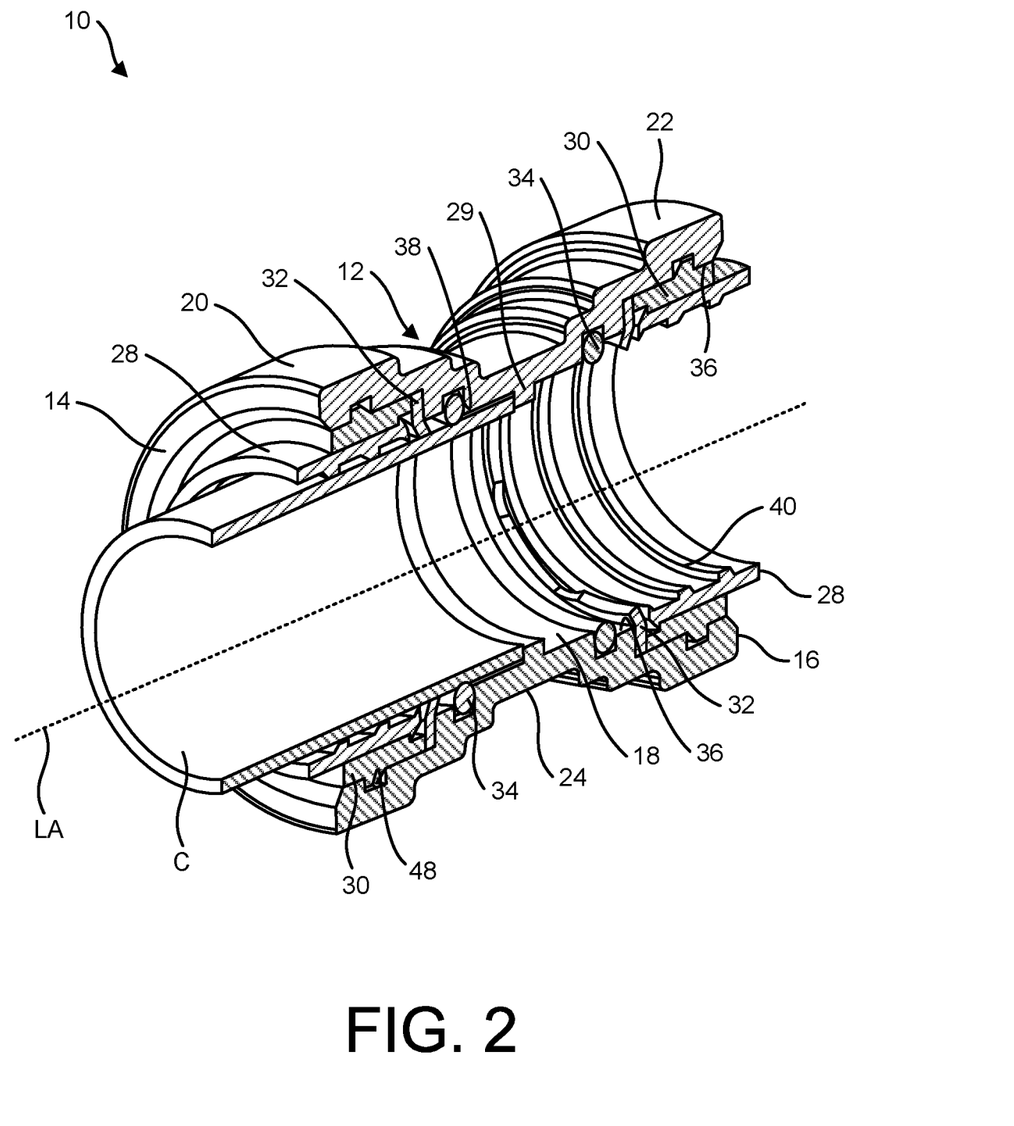
FIG. 2 is a cross section of the perspective in FIG. 1.

Referring to FIG. 1, one embodiment of an electrical conduit fitting constructed according to the teachings of the present disclosure is generally indicated at reference numeral 10. In general, this electrical conduit fitting 10 is in the form of a coupling designed and constructed to connect pieces of electrical conduit C to one another when installing a run of conduit. It is understood that the electrical conduit fitting may be of other types, including but not limited to a box connector and a conduit body, with the teachings set forth herein with respect to the illustrated coupling applying equally to other types of conduit fittings that connect to a piece of electrical conduit by friction/press connection. Conduits which can be connected using the fitting 10 include but are not limited to rigid metal conduits (RMC) and intermediate metal conduits (IMC).

Referring still to FIGS. 1-4, the electrical conduit fitting 10 includes a generally cylindrical fitting body 12 having opposing first and second open ends 14, 16, and an interior surface 18 defining an internal passage extending axially along a longitudinal axis LA of the fitting body between the first and second open ends thereof. A central transverse plane CP (FIG. 3) intersects the longitudinal axis LA at a generally orthogonal angle at a mid-length of the body 12. The fitting body 12 includes first and second connection sections 20, 22, respectively, adjacent the respective first and second open ends 14, 16, and a central portion 24 disposed between and interconnecting the first and second connection sections 20, 22. The connection sections 20, 22 have maximum inner and outer diameters that are greater than respective maximum inner and outer diameters of the central portion 24. The connection sections 20, 22 each have multiple transition portions that step down to the decreased inner and outer diameters of the central section 24. An annular shoulder 29 projects radially inward from an inner surface of the central portion 24 of the fitting body 12. As will be explained in greater detail below, the shoulder 29 functions as a stop for limiting insertion of the conduits C into the fitting body 12. In the illustrated embodiment, the shoulder 29 is disposed at a center of the fitting body 12 on the central transvers plane CP. However, the shoulder 29 could be located at other locations without departing from the scope of the disclosure. Additionally, more than one shoulder 29 can be disposed on the fitting body 12. For instance, a shoulder dedicated to each connection section 20, 22 of the fitting body 12 could be utilized. Thus, in the illustrated embodiment, two shoulders could be used. The fitting body 12 may be formed from metal, such as aluminum, steel, or other metal. However, the fitting body 12 may be formed from other materials without departing from the scope of the disclosure.

Figure 3:
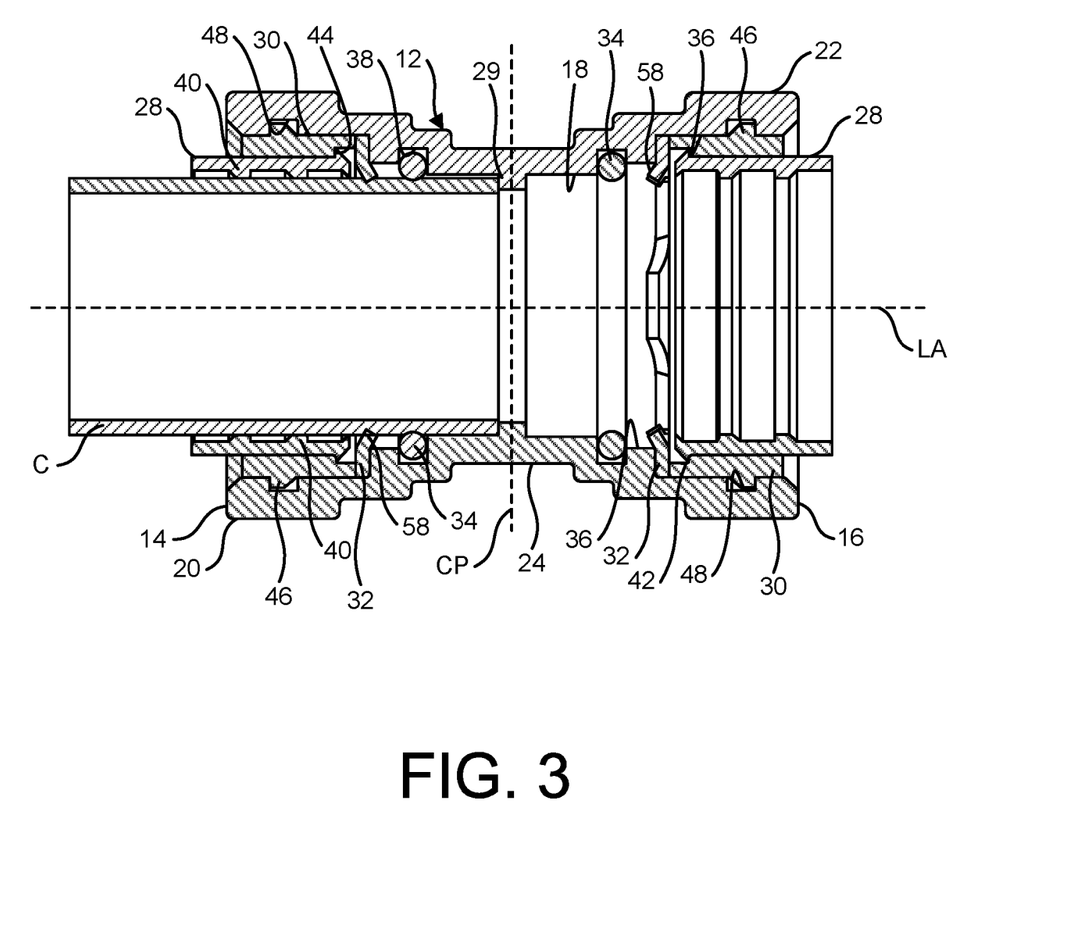
FIG. 3 is a side elevational view of the fitting in FIG. 1.

A guide 28, a guide retainer 30, a retaining ring 32, and a gasket 34 are received in each of the first and second connection sections 20, 22 of the fitting body 12. The guides 28, guide retainers 30, retaining rings 32, and gaskets 34 are generally arranged in the fitting body 12 as mirror images about the central transverse plane CP, as shown in FIG. 3. The guide 28, guide retainer 30, retaining ring 32, and gasket 34 may all work together to facilitate a secure connection between a conduit C and the fitting 10. Each of the guide 28, guide retainer 30, retaining ring 32, and the gasket 34 are generally ring-shaped (e.g., have annular shapes) defining axial openings that are generally axially aligned and generally axially aligned with the longitudinal axis LA of the fitting body 12. Alternatively, at least one or all of the guides 28, guide retainers 30, retaining rings 32, and gaskets 34 may have open or discontinuous ring shapes.

Referring to FIG. 3, the guide 28, guide retainer 30, and retaining ring 32 are disposed in first recessed portions 36 of the first and second connection sections 20, 22, and the gaskets 34 are received in second recessed portions 38 of the first and second connection sections. The second recessed portions 38 are located axially inward from the first recessed portions 36 such that the second recessed portions are disposed closer to the central transverse plane CP of the fitting body 12. The second recessed potions 38 are also spaced radially inward from the first recessed portions 36 such that the first recessed portions define a wider inner diameter of the connection sections 20, 22, and the second recessed portions define a narrower inner diameter of the connection sections. The central section 24 defines an inner diameter that is sized slightly larger than an outer diameter of the conduits C to provide at least one of a clearance or interference/friction fit between the fitting body 12 and the conduits C. Both the first and second recessed portions 36, 38 in the connection sections 20, 22 define inner diameters that are larger than the inner diameter of the fitting body 12 in the central section 24.

The guide retainers 30 engage inner surfaces of the first recessed portions 36 of the connection sections 20, 22, and the guides 28 are spaced radially inward from the guide retainers and engage inner surfaces of the guide retainers. The guide retainers 30 may be attached to the fitting body 12, such as by adhesive or a mechanical fastener. The guides 28 are secured to the inner surfaces of the guide retainers 30 such that the connection between the guide retainers and the guides retains the guides to the fitting body 12. As such, the guides 28 may be attached to the guide retainers 30 by adhesive or a mechanical fastener. The guides 28 and guide retainers 30 are disposed generally at the first and second ends 14, 16 of the fitting body 12. The guides 28 extend axially past their respective guide retainers 30, and axially past their respective first and second ends 14, 16 of the fitting body 12. Thus, the guides 28 define the longitudinal ends of the fitting 10. However, the guides 28 may be flush with the first and second ends 14, 16 of the fitting body 12 or recessed axially inward from the first and second ends of the fitting body without departing from the scope of the disclosure. The retaining rings 32 are located between the guides 28 and guide retainers 30 and the gaskets 34. In the illustrated embodiment, each retaining ring 32 is captured between an edge of the first recessed section 36 and a guide retainer 30. The retaining rings 32 may be attached to the fitting body 12, such as by adhesive or a mechanical fastener. The gaskets 34 are disposed axially inward from the retaining rings 32. The gaskets 34 may be secured in the second recessed sections 38 by adhesive or friction fit.

Figure 4:
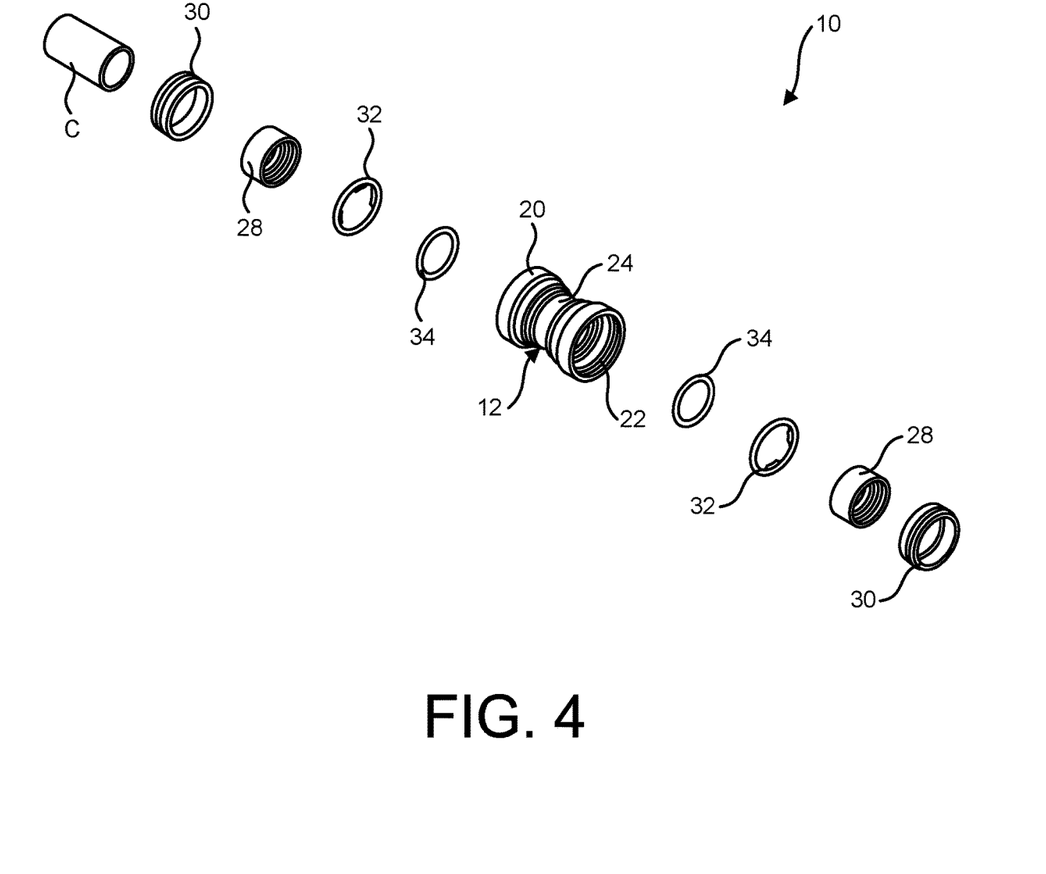
FIG. 4 is an exploded view of FIG. 1.
Figure 5:
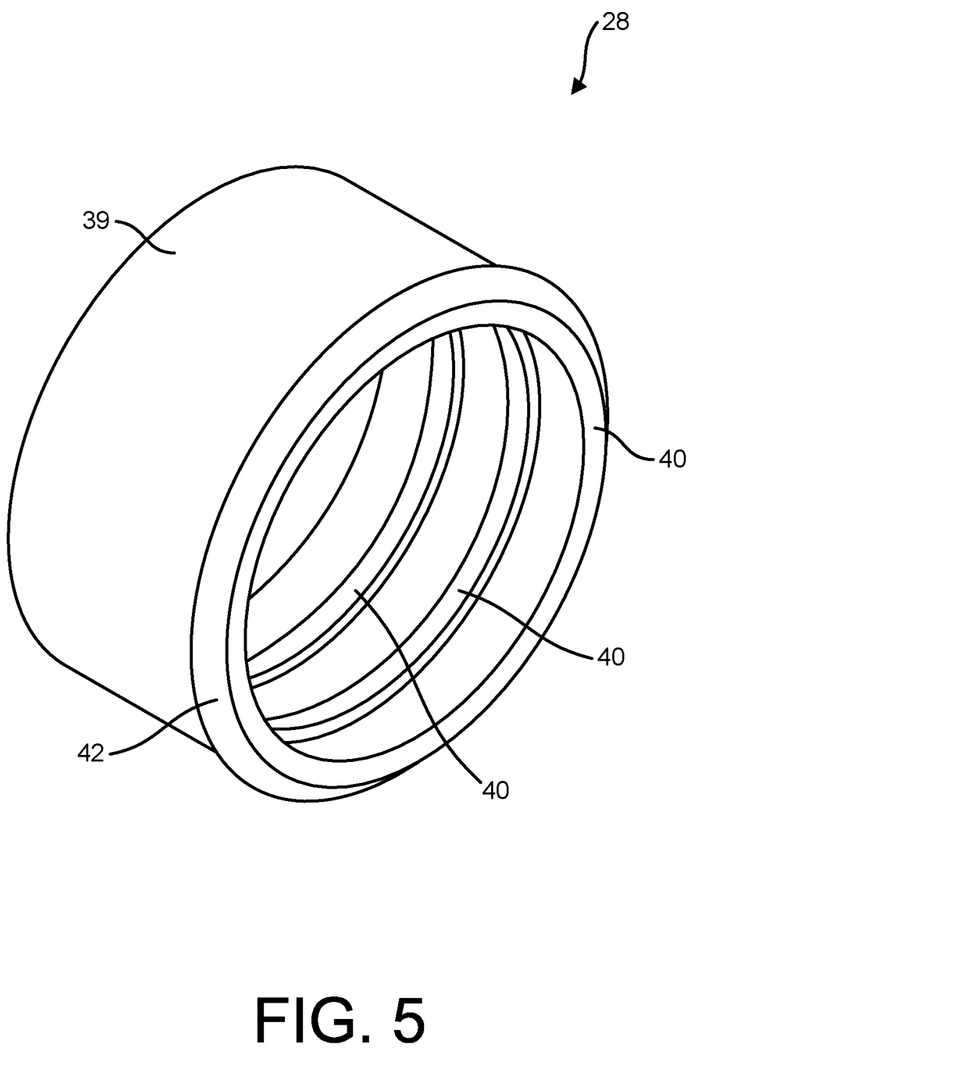
FIG. 5 is an enlarged perspective of a guide of the fitting.

Referring to FIGS. 3-5, each guide 28 comprises a sleeve body 39 (FIG. 5) including a plurality of annular projections 40 extending radially inward from an inner surface of the sleeve body. The annular projections 40 are axially spaced along the sleeve body 39. In the illustrated embodiment, each projection 40 includes an angled ramp surface on an outwardly facing side of the projection. The ramp surfaces may function to guide or funnel the conduits C into the fitting 10 to center the conduit within the fitting along the longitudinal axis LA. As shown in FIG. 3, there are three projections 40 on each guide 28. However, more or less projections 40 may be utilized without departing from the scope of the disclosure. An annular rim 42 on an outer surface of the sleeve body 39 extends around a medial end of the guide 28. The annular rim 42 defines a catch for locating the guide 28 relative to the guide retainer 30. The guides 28 may be formed from any suitable material. In one embodiment, the guides 28 are formed from plastic.

Each guide retainer 30 comprises a sleeve body having an inner surface and an outer surface. An inner diameter of the guide retainer 30 is sized to receive the guide 28 within the guide retainer. As such, the inner dimeter of the sleeve body of the guide retainer 30 is sized slightly larger than an outer diameter of the sleeve body 29 of the guide 28. An annular lip 44 is formed near a medial end of the guide retainer 30. The annular rim 42 of the guide 28 is configured to seat on the annular lip 44 of the guide retainer 30 to locate the guide on the guide retainer. Thus, the engagement between the lip 44 and rim 42 limits movement of the guide 28 out of the ends 14, 16 of the fitting body 12. Further, an annular projection 46 extends radially outwardly from the outer surface of the sleeve body of the guide retainer 30. The annular projection 46 is received in a third recessed portion 48 in the connection sections 20, 22. The annular projection 46 defines an engagement surface that extends orthogonally from the outer surface of the sleeve body of the guide retainer 30. The engagement surface of the annular projection 46 seats against an edge of the third recessed portion 48 to limit movement of the guide retainer 30 along the longitudinal axis LA out of the ends 14, 16 of the fitting body 12. The guide retainers 30 may be formed from any suitable material. In one embodiment, the guide retainers 30 are rubber.

Figure 6:
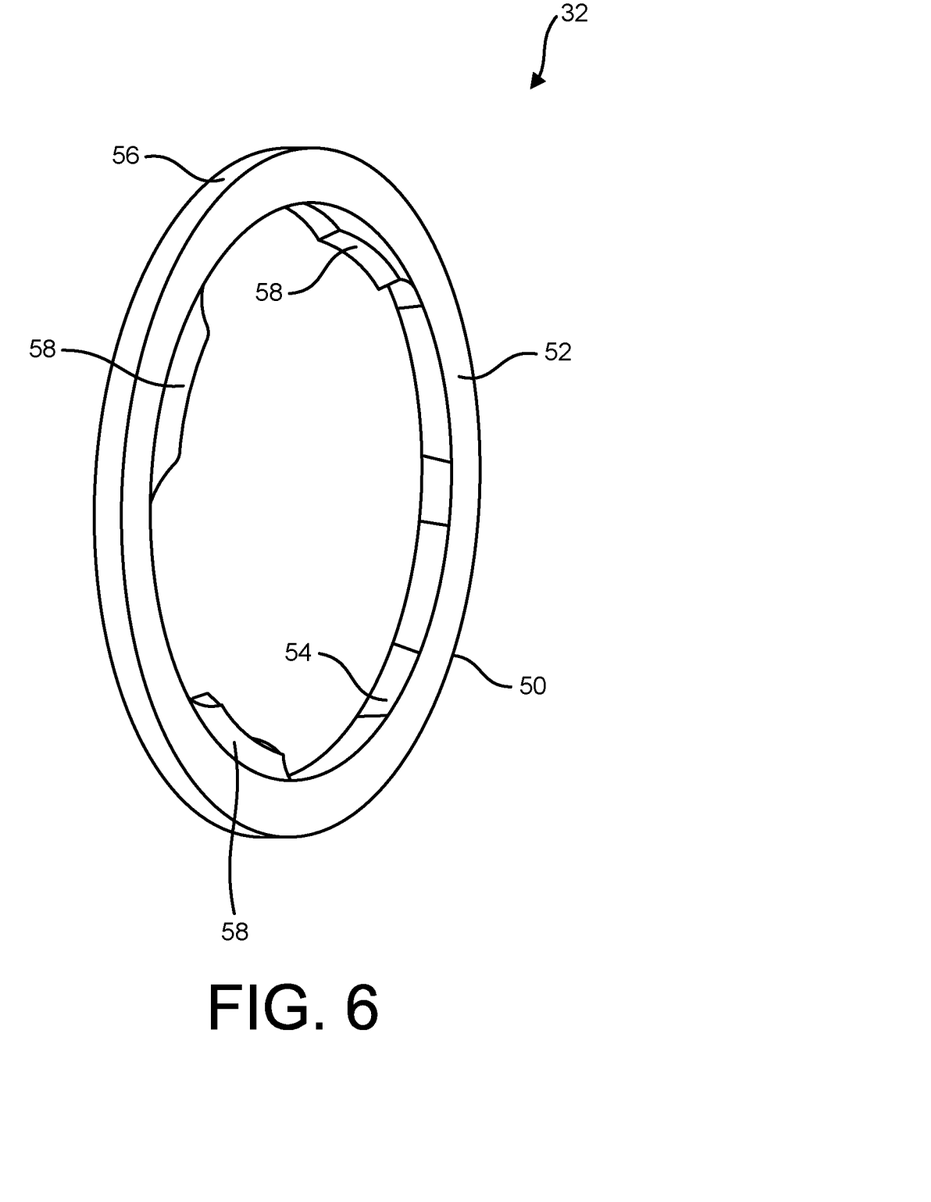
FIG. 6 is an enlarged perspective of a retaining ring of the fitting.

Referring to FIGS. 3 and 6, each retaining ring 32 comprising an annular ring body 50 having opposing planar side surfaces 52, an inner surface 54, and an outer surface 56 opposing the inner surface. A plurality of teeth 58 are spaced circumferentially around the inner surface 54 and extend radially inward form the inner surface. The teeth 58 also extend radially inward at an angle such that a plane of each tooth extends at an angle to the opposing side surfaces 52 of the ring body 50. In particular, the retaining rings 32 are disposed in the fitting body 12 so that the teeth 58 project toward the central plane CP of the fitting 10. As will be explained in greater detail below, this configures the teeth 58 to bite into a conduit C and prevent the conduit from being withdrawn from the fitting 10 once the conduit has been inserted. In the illustrated embodiment, there are three teeth 58 on the retaining ring 32. However, more or less teeth 58 may be used without departing from the scope of the disclosure. Additionally, while a single retaining ring 32 is shown for each connection section 20, 22, multiple retaining rings 32 may be stacked in parallel at one or both of the connection sections to provide an enhanced grip capability to the fitting 10. Each retaining ring 32 may be broadly considered a retainer.

Referring to FIG. 6, each tooth 58 has a generally trapezoidal shape including concave side and top surfaces. Edges between the concave side and top surfaces define sharp edges for at least partially cutting or biting into a conduit as will be explained in greater detail below. The teeth 58 may have other configurations without departing from the scope of the disclosure. In one embodiment, the retaining rings 32 including the teeth 58 are formed from metal. However, any suitable material may be used in the construction of the retaining rings 32.

Referring to FIG. 3, each gasket 32 makes a desired and suitable gas and/or liquid tight seal with a piece of conduit C inserted into the fitting 10 during the connection process. Each gasket 32 may be formed from a suitable polymer, such as rubber, or other material for making a desired and suitable gas and/or liquid tight seal with the piece of conduit inserted into the fitting during the connection process. It is understood that in one or more embodiments, the connection sections 20, 22 of the fitting 10 may include more than one gasket 32. Additionally, the gaskets 32 can be omitted.

The teeth 58 of the retaining ring 32 are configured to apply a gripping force on a piece of electrical conduit C (e.g., both a non-threaded and a threaded electrical conduit) inserted into the fitting 10 after the guide 28 has axially aligned or centered the piece of the electrical conduit in the fitting. In particular, the piece of electrical conduit C engages the teeth 58, causing the teeth to cut or bite, at least partially, into the conduit. This engagement between the retaining ring 32 and the conduit C holds the conduit in position in the fitting 10. The gripping force of the retaining ring 32 may be overcome by applying sufficient withdrawal force on the piece of electrical conduit C to remove the piece of electrical conduit from the fitting 10, if desired by the user. The engagement components (i.e., guide 28, retaining ring 32, and gasket 34) of the fitting 10 allow the fitting to be used with electrical conduits having a longitudinal end portion with a constant diameter (e.g., a non-threaded conduit) or an electrical conduit having a threaded end portion. However, as can be seen, no threaded components are utilized in the fitting 10. Therefore, the time and effort needed to effect a secure connection between the fitting 10 and a conduit C is reduced.

In use, the guide 28 centers the piece of electrical conduit C as the conduit is inserted into one of the open ends 14, 16 the fitting body 12 of the fitting 10 to aid the user in forming the conduit run. Depending of the size, the conduit C may be inserted into the fitting body 12 by hand or through the use of a tool having a push assist mechanism. Next, the conduit C is moved past the retaining ring 32. The angled teeth 58 are angled away from the ends 14, 16 of the fitting body 12 which further facilitates insertion of the conduit C into the fitting 10. The conduit C then can be moved past the gasket 34 where the gasket forms a gas/liquid seal with the conduit. Insertion of the conduit C into the fitting body 12 is finally limited by engagement with the annular shoulder 29 on the fitting body 12. The annular shoulder 29 also facilitates positioning the piece of electrical conduit C within the fitting 10 so that the user knows the depth at which the piece of conduit is inserted into the fitting (which also indicates the distance apart the two pieces of electrical conduit are in the fitting when two conduits are inserted). This maximum depth of insertion and/or distance between the ends of the two pieces of electrical conduit C is defined by a width of the shoulder 29. The angled teeth 58 on the retaining ring 32 are positioned to resist movement of the conduit C back out of the ends 14, 16 of the fitting body 12. To this effect, an initial force to withdrawn the conduit from the passage in the fitting body 12 is resisted by the teeth 58 biting into the conduit C. Therefore, the fitting 10 is connected to the piece of electrical conduit C simply by inserting the conduit into an end of the fitting. Additionally or alternatively, the fitting 10 can be connected to the conduit C using a press tool including jaws that radially press and mechanically deform the connection sections 20, 22 of the fitting body 12 in a radially inward direction to further facilitate the teeth 58 of the retaining ring 32 engaging and digging into the piece of electrical conduit.

Each embodiment of the electrical conduits described herein may be designed and configured to meet the standards set forth in UL 514B.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A fitting for an electrical conduit comprising:
a fitting body having first and second open ends, and an interior surface defining a passage adapted to receive a piece of the electrical conduit therein, the fitting body including a connection section that is configured to receive and connect to the electrical conduit during a connection process;
a retainer in the passage at the connection section of the fitting body, the retainer including teeth adapted to engage the piece of electrical conduit received in the passage when the electrical conduit is inserted into the connection section through the first open end during the connection process; and
a guide in the passage at the first connection section of the fitting body, wherein the guide comprises a sleeve body including a plurality of projections extending radially inward from an inner surface of the sleeve body and configured to engage the piece of electrical conduit, the guide being configured to receive and center the piece of electrical conduit in the fitting body before the retainer engages the electrical conduit during the connection process.

2. The fitting set forth in claim 1, wherein the fitting is free of threads.

3. The fitting set forth in claim 1, wherein the retainer comprises a retaining ring including a ring body, the teeth projecting radially inward from the ring body at an angle.

4. The fitting set forth in claim 3, wherein the retaining ring is metal.

5. The fitting set forth in claim 1, wherein the each of the plurality of projections is an annular projection extending around the inner surface of the sleeve body.

6. The fitting set forth in claim 5, wherein the guide is plastic.

7. The fitting set forth in claim 5, further comprising a guide retainer in the passage of the fitting body, the guide retainer securing the guide to the fitting body.

8. The fitting set forth in claim 7, further comprising a gasket received in the connection section of the fitting body and configured to form a seal with the piece of electrical conduit during the connection process, wherein the gasket engages the piece of electrical conduit that has passed through the retainer.

9. The fitting set forth in claim 1, wherein the fitting body defines an internal stop configured to inhibit the piece of electrical conduit from extending past the internal stop, wherein the internal stop engages a longitudinal end of the electrical conduit that has passed through the retainer.

10. The fitting set forth in claim 1, further comprising a plurality of retainers arranged in parallel in the connection section.

11. The fitting set forth in claim 1, wherein the connection section comprises a first connection section, the fitting body further comprising a second connection section arranged as a mirror image about a central transverse plane of the fitting body.

12. The fitting set forth in claim 1,
wherein each tooth of the retainer has a trapezoidal shape including a concave side.

13. The fitting set forth in claim 12, wherein the fitting is free of threads.

14. The fitting set forth in claim 12, wherein the retainer comprises a retaining ring including a ring body, the teeth projecting radially inward from the ring body at an angle.

15. The fitting set forth in claim 14, wherein the retaining ring is metal.

16. The fitting set forth in claim 12, further comprising a plurality of retainers arranged in parallel in the connection section.

17. The fitting set forth in claim 12, further comprising a gasket received in the connection section of the fitting body and configured to form a seal with the piece of electrical conduit during the connection process.

18. The fitting set forth in claim 12, wherein the fitting body defines an internal stop configured to inhibit the piece of electrical conduit from extending past the internal stop.

19. The fitting set forth in claim 12, wherein the connection section comprises a first connection section, the fitting body further comprising a second connection section arranged as a mirror image about a central transverse plane of the fitting body.

20. The fitting set forth in claim 19, wherein the fitting body includes a central portion disposed between and interconnecting the first and second connection sections, the connection sections having maximum inner and outer diameters that are greater than respective maximum inner and outer diameters of the central portion.

* * * * *